C. W. GROOT.
AUTOMATIC REVERSING MECHANISM.
APPLICATION FILED JAN. 12, 1921.
Patented Feb. 28, 1922.
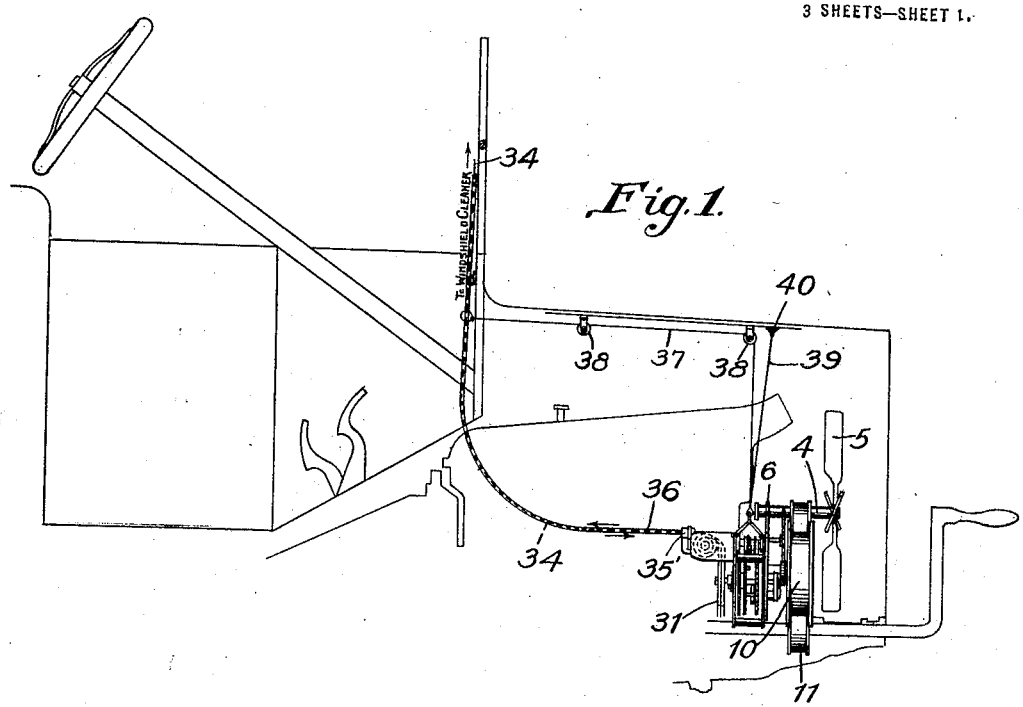
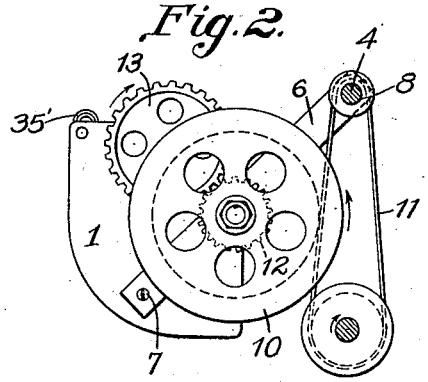
C. W. GROOT
INVENTOR.
BY
Mason Fenwick Lawrence
ATTORNEYS.

C. W. GROOT.
AUTOMATIC REVERSING MECHANISM.
APPLICATION FILED JAN. 12, 1921.

1,408,289.

Patented Feb. 28, 1922.
3 SHEETS—SHEET 3.

C. W. GROOT
INVENTOR.

BY
Mason Fenwick Lawrence
ATTORNEYS.

UNITED STATES PATENT OFFICE.

CHARLES WILLIAM GROOT, OF ROCHESTER, NEW YORK.

AUTOMATIC REVERSING MECHANISM.

1,408,289.  Specification of Letters Patent.  Patented Feb. 28, 1922.

Application filed January 12, 1921. Serial No. 436,711.

*To all whom it may concern:*

Be it known that I, CHARLES W. GROOT, a citizen of the United States, residing at Rochester, in the county of Monroe and State of New York, have invented certain new and useful Improvements in Automatic Reversing Mechanisms; and I do hereby declare the following to be a full, clear, and exact description of the invention, such as will enable others, skilled in the art to which it appertains to make and use the same.

This invention relates to new and useful improvements in windshield cleaners and more particularly to the means for operating the wiper or cleaner, the main object of the present invention being the provision of improved operating means deriving its power from the motor of the vehicle, said means being controlled from the driver's seat whereby the same can be readily engaged with the moving parts of the vehicle engine or disengaged therefrom at the will of the operator.

Another object of the present invention is the provision of means for operating a windshield cleaner whereby the wiper or cleaner will be alternately moved across the windshield in opposite directions, said means being loosely mounted upon the fan operating shaft and adapted to engage the fan belt for imparting movement thereto, said means being controlled from the operator's seat so that when the operator desires to clean the windshield of the accumulation of vapor or other substance on the windshield, he can readily operate the cleaner without moving from the seat.

With the above and other objects in view, the invention consists in the novel features of construction, combination and arrangement of parts hereinafter more fully set forth, pointed out in the claims and shown in the accompanying drawings in which:

Figure 1 is a side elevation illustrating my improved operating mechanism arranged in position with respect to the engine of a motor vehicle.

Fig. 2 is a side elevation;

Figure 3:
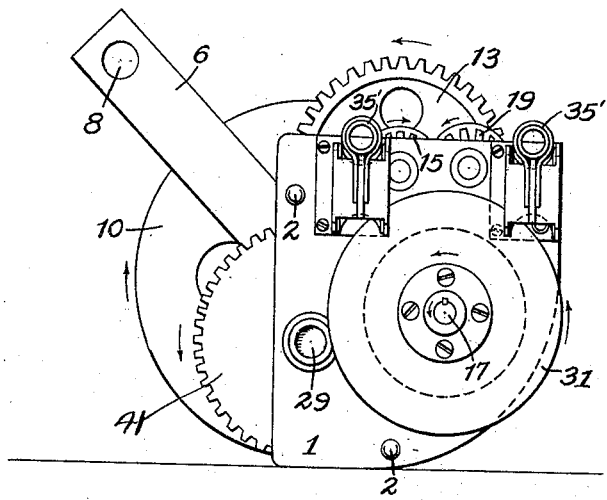
Fig. 3 is a side elevation looking toward the side opposite that shown in Fig. 2.
Figure 4:
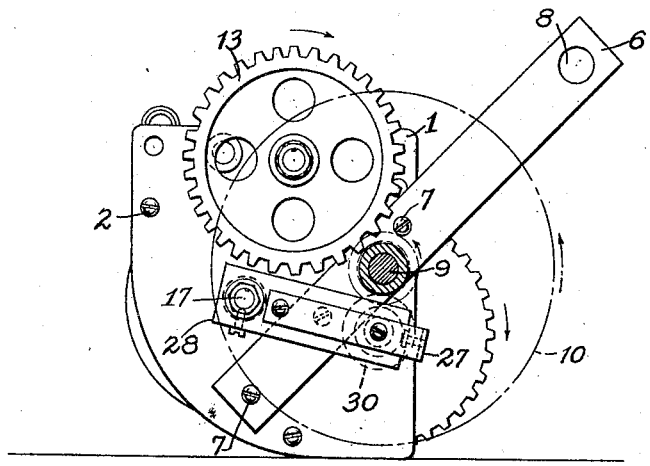
Fig. 4 is an enlarged elevation taken from the opposite side of the showing in Fig. 3, the operating wheel being illustrated in dotted lines.
Figure 5:
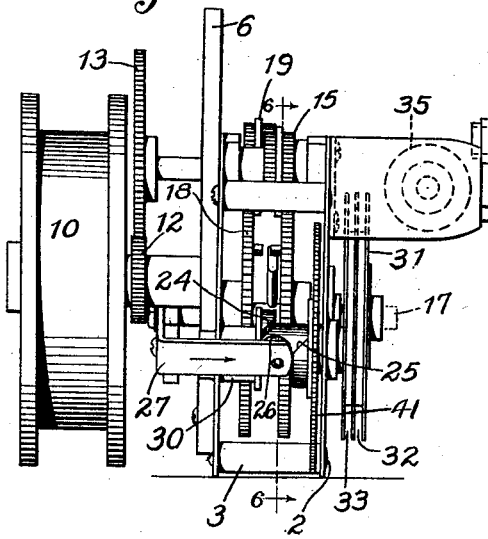
Fig. 5 is an end elevation.
Figure 6:
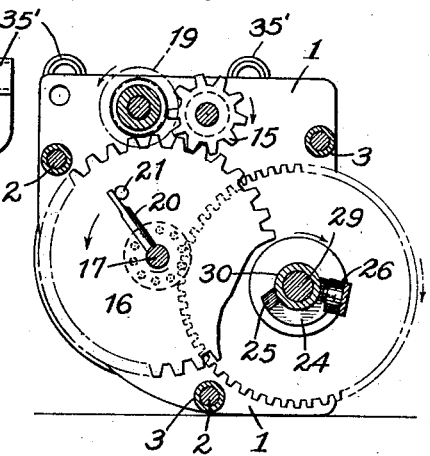
Fig. 6 is a transverse section taken on the line 6—6 of Fig. 5.
Figure 7:
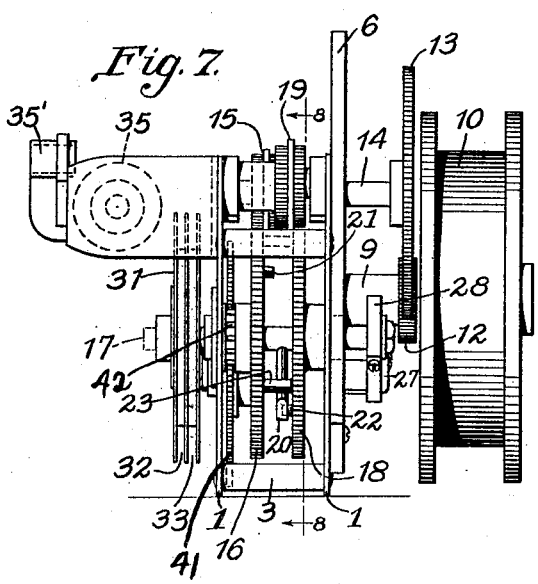
Fig. 7 is an end elevation looking toward the end opposite that shown in Fig. 5; and, Fig. 8 is a transverse sectional view taken on the line 8—8 of Fig. 7.
Figure 8:
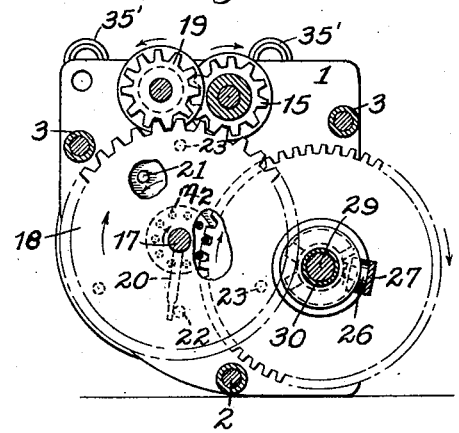

In the construction of my improved operating mechanism I provide two supporting plates generally indicated by the numeral 1 suitably connected together at intervals by means of the bolts 2. Mounted upon the bolts 2 and arranged between the plates 1 are the sleeves 3 which form spacing mediums for the plates 1, said sleeves being shown secured in their respective positions by means of the bolts 2. The frame which includes the plates 1, the bolts 2 and the sleeves 3 is mounted for movement upon the shaft 4 which operates the cooling fan 5 of a motor vehicle by means of an arm 6, the inner end of which is disposed in an oblique angle with respect to the frame and attached thereto by means of the screw bolts 7. The outer end of the arm 6 is provided with an opening 8 adapted to receive the fan shaft 4. From this it will be noted that the frame of the operating mechanism is loosely mounted upon the fan shaft 4 and adapted to be swung to various positions.

Secured to the arm 6 upon the outer side thereof is a stub shaft 9 upon which is mounted the driving pulley 10 and it will be noted that the pulley 10 is grooved for engagement with the fan belt 11, the weight of the frame and the parts carried thereby forcing the grooved pulley 10 into engagement with the fan belt 11 whereby to impart movement to the pulley. Secured to the inner face of the pulley and mounted upon the shaft 9 is a pinion 12 adapted to mesh with a gear 13. This gear 13 is mounted upon the outer end of the transverse shaft 14 which extends through the plates 1 and has mounted thereon between the plates a double gear 15.

It will be noted from the above that upon rotation of the pulley 10, movement will be imparted to the gear 13 and the shaft 14 which in turn will impart movement to the gear 15. One-half of the double gear 15 is adapted to mesh with a gear 16 mounted upon a transverse shaft 17, said shaft carrying a second gear 18 arranged in spaced relation with the gear 16 and operated by means of a double gear 19, the gear 19 deriving its power by having one-half of the same engaging with a half of the gear 15. From this it will be noted that one-half of the gear 15 engages the gear 16 while the other half engages the gear 19 whereby the second half of the gear 19 will operate the gear 18 and it will be noted that from this arrangement the gears 16 and 18 are rotating in opposite directions.

The shaft 17 is loosely mounted within suitable bearings in each of the plates 1 and extending at right angles from the shaft at a point between the gears 16 and 18 is an arm 20, said arm being adapted to alternately engage the pin 21 on the gear 16 and the pin 22 on the gear 18 whereby to rotate the shaft 17 in opposite directions. It will be noted that the two gears 16 and 18 are spaced apart and retained in their respective spaced position by means of the spacing pins 23 carried by one of the gears and adapted to move over the face of the opposite gear.

In order to impart a sliding movement to the shaft 17 so that the arm 20 will be moved in opposite directions to engage either the pin 21 or the pin 22, a sleeve 30 is arranged between the plates 1 and has its ends suitably mounted within the plates. Arranged upon this sleeve is a grooved member 24, having alternately arranged inclined passage ways 25 and movable within these grooves is a cam member 26, said cam member being supported by an arm 27, the outer end of which is attached to the connecting bar 28. This bar 28 has one end connected to one end of the shaft 17 while the other end is connected to a shaft 29 movable within the sleeve 30. From this it will be apparent that as the cam member 26 moves within the alternately arranged grooves in the member 24 the shaft 17 will be moved longitudinally by means of the arm 27 and the bar 28 so that as the cam member 26 rides through the inclined portions from one groove to the other the shaft 17 will be moved longitudinally to engage the arm 20 with the pins 21 and 22 whereby to rotate the shaft 17 in opposite directions for a predetermined length of time. In the construction of the operating mechanism it is preferred to arrange the alternate grooves and the inclined passageways between said grooves so that the required length of time for which the shaft 17 must be operated to move the cleaner from one side of the windshield to the other can be readily determined. Thus while the cam member 26 is passing from one inclined portion to the other, the wiper or cleaner will be moved from one side of the windshield to the other.

In order to impart movement to the wiper or cleaner mounted upon the windshield a grooved pulley 31 is mounted upon the shaft 17 opposite the bar 28, said pulley being provided with two spaces 32 and 33 and wound within these spaces are the cords 34, said cords being extended up over the pulleys 35 and through the tubular guide members 35' into a tube 36, this tube 36 leading upwardly to the windshield cleaner as illustrated in Fig. 1. The cords 34 are connected to opposite sides of the cleaner or wiper, one of said cords being adapted to pull the wiper or cleaner in one direction across the windshield, while the other cord will pull the cleaner or wiper in the opposite direction across the windshield, this movement being carried out by means of the pulley 31 wherein each of the cords operate within their respective grooves or spaces 32 or 33. From this it will be apparent that when the arm 20 is engaging one of the pins 21 or 22 on the gears 16 and 18 the shaft 17 will be rotated in one direction, so that one of the cords in the spaces 32 and 33 is being wound up while the other is being unwound, thus moving the cleaner or wiper in one direction across the windshield, but as soon as the cam member 26 reaches the end of the groove in which it is moving and strikes the inclined passageway at the end of the groove and is moved into the groove arranged alternate from the groove in which it has been previously operating, the shaft 17 will be moved longitudinally so that the arm 20 will engage the pin on the opposite gear and rotate the shaft 17 in the opposite direction to thus wind the cord which has been previously unwound, and unwind the cord which has been previously wound, and thus move the cleaner or wiper across the windshield in the opposite direction.

In order to operate my improved mechanism from the driver's seat, a suitable cable 37 is attached to the frame of the operating mechanism and extended up over the pulleys 38 to a position on the dash in front of the driver where any suitable means may be provided for retaining the grooved pulley 10 out of engagement with the fan belt 11 when the device is not in use. It is to be understood that it will not require the entire weight of the operating mechanism to cause sufficient pressure of the pulley 10 on the fan belt 11 to impart movement to the gears, but only a certain amount of pressure is required so that the entire weight of the frame and parts carried thereby need not be exerted on the fan belt, and in order to prevent the entire weight of the parts being carried by the fan belt an emergency cable 39 is provided, the upper end of which is attached to the hood of the motor vehicle as shown at 40 while the lower end is attached to the frame of the operating mechanism. From this it will be apparent that when the cable 37 is released by the operator, the weight of the operating mechanism will move downwardly until the pulley 10 has engaged the fan belt sufficiently to impart movement to the pulley. The cable 39 will prevent any further downward movement of the frame and the parts carried thereby so that the entire weight of the operating mechanism will not be exerted upon the fan belt.

It will be noted that the sleeve 30 is rotated by having the gear 41 thereon engage with the rotary rack 42 which is carried by the shaft 17. This gear 41 is known as the timing gear and in the present instance it has a ratio of 6 to 1 with respect to the rack gear 42 so that the grooved pulley 31 will be rotated three revolutions in one direction while the cam member is passing through one of the alternately arranged grooves in the sleeve 30, and thence as the cam member 26 passes to the opposite groove, the pulley will be reversed and rotated three revolutions in the opposite direction. Should it be desired to change the revolutions of the grooved pulley 31, the gear 41 can be readily interchanged for the gear of a large or smaller ratio according to the number of revolutions required by the grooved pulley 31.

From the above description taken in connection with the accompanying drawings it will be apparent that I have provided a simple and durable device which can be quickly and readily applied to the fan shaft of any well known type of motor vehicle and arranged so that the pulley 10 will derive its power from the fan belt or any rotating part of the motor not equipped with fan belt to which a split pulley may be clamped, and the cords 34 which operate the cleaner or wiper can be readily placed in position and engaged with the cleaner or wiper to be used on the windshield.

I claim as my invention:

1. An operating device of the class described including a supporting frame, a longitudinally movable shaft mounted for rogitudinally movable shaft mounted for rotation within the frame, a grooved pulley carried by one end of said shaft, means for imparting rotation to said shaft, an arm connected to the end of the shaft opposite the pulley, a cam member supported by said arm, a sleeve mounted for rotation within the frame having alternately disposed grooves provided with inclined communications in which said cam is adapted to ride for imparting movement to the shaft to shift the same longitudinally, and means carried by the shaft whereby to cause the same to rotate in opposite directions at predetermined intervals upon the longitudinal movement of the shaft, and means connecting the sleeves with the shaft whereby to impart movement to the sleeve for shifting the arm and shaft simultaneously.

2. An operating device of the class described including a supporting frame, a rotating shaft mounted for longitudinal sliding movement on the frame, spaced gears mounted upon said shaft, lugs carried by the gears and extending inwardly from the inner faces thereof, an arm carried by the shaft and adapted to engage said lugs upon rotation of the shaft, means whereby to move the shaft in opposite directions at predetermined intervals and move the arm from engagement with the lugs on one gear to engagement with lugs on the opposite gear, and means for rotating said gears in opposite directions.

3. An operating device of the class described including a supporting frame, a longitudinally movable shaft mounted for rotation within the frame, spaced gears mounted on the shaft and adapted to be rotated in opposite directions, a sleeve supported within the frame having alternately arranged grooves provided with inclined communicating passages an arm connected with one end of the shaft, a cam on the arm operating within the alternately arranged grooves, an arm extending outwardly from the shaft and disposed between said gears, lugs formed on the inner faces of said gears, and means forming connection between the sleeve and shaft whereby to impart movement to this sleeve simultaneously with the shaft whereby the shifting of the cam from one of the alternate grooves to the other will disengage the arm and the shaft from the lug on one of said gears and engage the same with the lug on the opposite gear for rotating the shaft in opposite directions at predetermined intervals.

In testimony whereof I affix my signature.

CHARLES WILLIAM GROOT.